June 17, 1958  F. H. MUELLER  2,839,076
QUICK-OPENING PRESSURE RELIEF VALVE
Filed March 24, 1953  3 Sheets-Sheet 1

INVENTOR
Frank H. Mueller

BY Cushman, Darby & Cushman
ATTORNEYS

June 17, 1958  F. H. MUELLER  2,839,076
QUICK-OPENING PRESSURE RELIEF VALVE
Filed March 24, 1953  3 Sheets-Sheet 2

INVENTOR
Frank H. Mueller
BY
Cushman, Darby & Cushman
ATTORNEYS

June 17, 1958 F. H. MUELLER 2,839,076
QUICK-OPENING PRESSURE RELIEF VALVE
Filed March 24, 1953 3 Sheets-Sheet 3
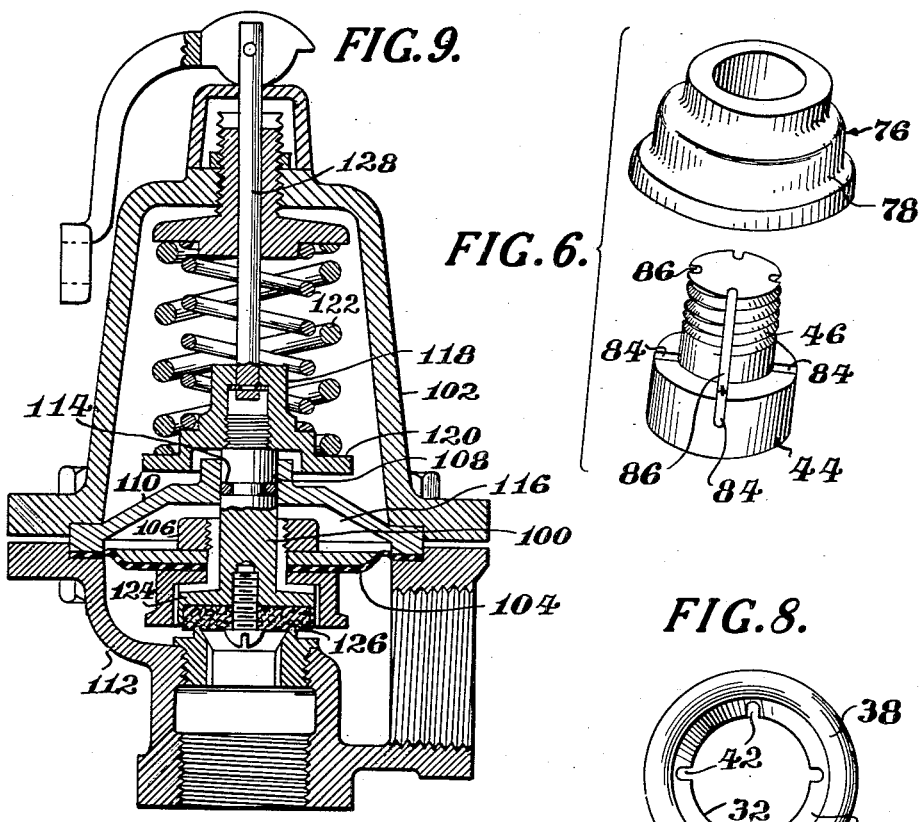
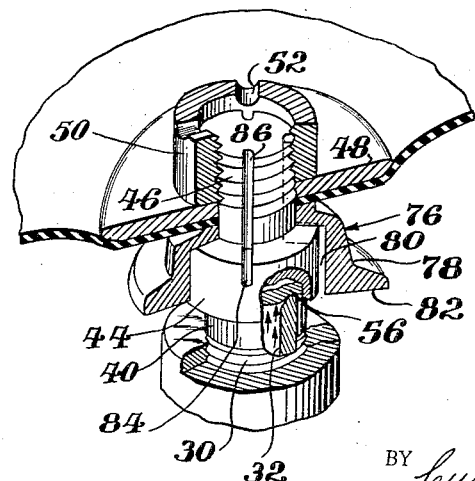
INVENTOR
Frank H. Mueller
BY Cushman, Darby & Cushman
ATTORNEYS

United States Patent Office 2,839,076
Patented June 17, 1958

2,839,076

QUICK-OPENING PRESSURE RELIEF VALVE

Frank H. Mueller, Decatur, Ill., assignor to Mueller Co., Decatur, Ill., a corporation of Illinois Application March 24, 1953, Serial No. 344,315

16 Claims. (Cl. 137—469)

This invention relates to pressure relief valves of the type which may be used, for example, as a safety relief valve for a steam boiler, and more particularly to improved means for obtaining a greater and more rapid opening of a pressure relief valve after the initial opening thereof.

It is highly desirable in pressure relief valves of this nature to obtain a rapid and greater opening of the valve after it has been initially opened only by the pressure of the fluid to be relieved, this latter pressure usually acting only on the area of a movable valve member encompassed by an annular valve seat. This desirable characteristic is necessary because most valves for steam pressure relief must be designed not only to open at a given predetermined pressure, but also to relieve the steam which continues to be developed in the system being relieved without permitting an appreciable pressure rise in the system over the initial valve-opening pressure.

Heretofore, a higher and quicker lift of the movable valve member of pressure relief valves has been obtained principally through a huddling chamber construction, which is well-known in the art. Even with this type of construction, however, pressure relief valves are not always entirely satisfactory. Pressure relief valves of the type under consideration, and also those involving a huddling chamber construction, usually consist of a spring loaded reciprocating valve disc seating upon an annular valve seat bounding a valve orifice. The valve is opened at a predetermined system pressure solely by the force developed by such pressure acting on the surface of the valve disc exposed to the valve orifice, i. e., the area encompassed or circumscribed by the valve seat. When the valve opens initially, a thin stream of fluid, termed "seat flow stream," flows at high velocity radially outwardly from between the partially open valve disc and its seat. Because of its high velocity, this seat flow stream has an extremely low static pressure, termed "seat flow pressure," that operates on an annular area of the valve disc to impart a closing effect thereto. Such closing effect partially offsets the opening force exerted on the valve disc by fluid pressure within the valve orifice, and if the closing effect is large enough, the valve tends to shut immediately after the initial opening without appreciably relieving the system pressure. Consequently the cycle of opening and closing movements is repeated so rapidly that the valve disc chatters on its seat, a highly undesirable effect.

Accordingly, it is an object of this invention to provide an improved pressure relief valve which will not chatter on its seat.

It is another object of this invention to provide an improved pressure relief valve which rapidly opens wide after the initial opening thereof by the pressure of the fluid to be relieved.

It is another object of this invention to provide a pressure relief valve which utilizes the reduced pressure of the high velocity flow between the valve member and its seat at the initial opening of the valve to accomplish a rapid and higher opening of the valve.

It is another object of this invention to provide a pressure relief valve in which the closing effect is minimized.

It is a further object of this invention to provide a pressure relief valve having increased flow capacity for a given valve opening.

Other objects and advantages of the invention will be evident from the following description and accompanying drawings in which:

Figure 6 is an exploded perspective view of certain parts of the movable valve member.

Figure 7 is an enlarged fragmetary perspective view of the movable valve member and its seat, with portions being broken away.

Figure 8 is an enlarged end view of the valve nipple.

Figure 9 is a view corresponding to Figure 2, but illustrating a modified form of the invention.

Figure 1:
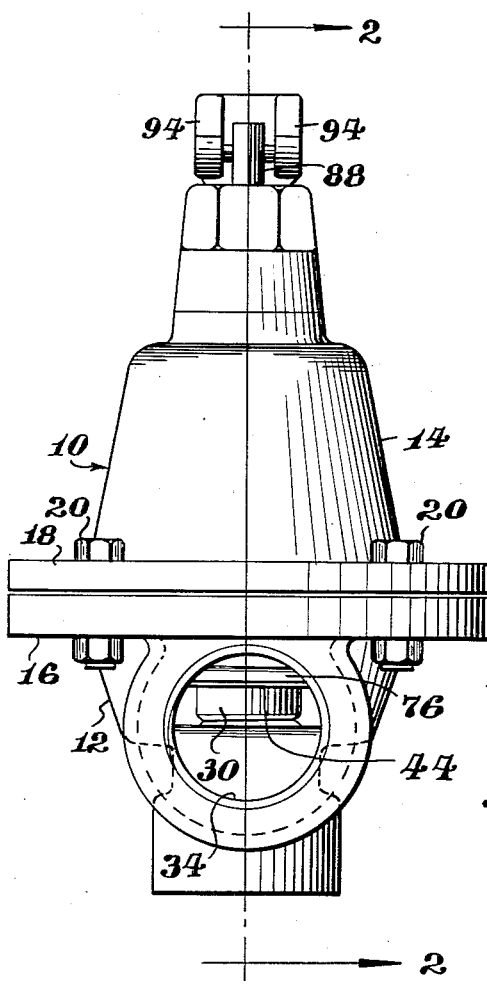
Figure 1 is a side elevational view of a pressure relief valve embodying this invention.
Figure 2:
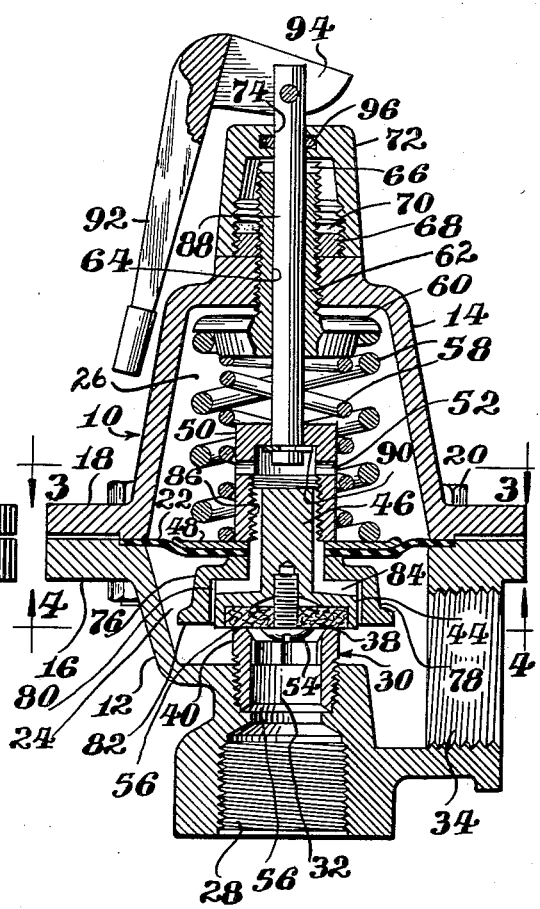
Figure 2 is a vertical sectional view taken on line 2—2 of Figure 1.
Figure 3:
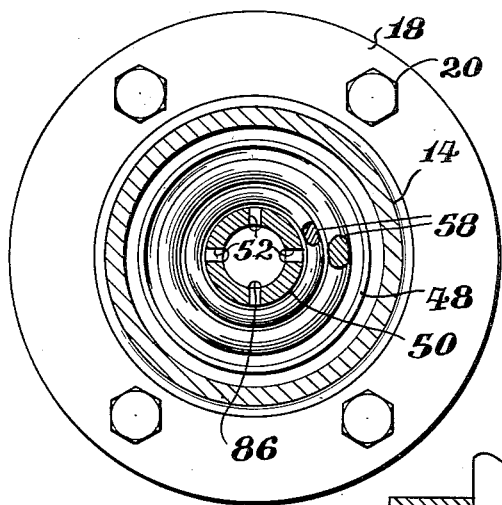
Figure 3 is a horizontal sectional view taken on line 3—3 of Figure 2.
Figure 4:
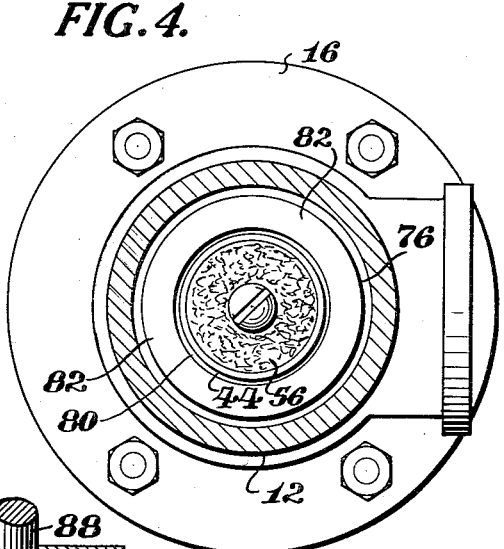
Figure 4 is a horizontal sectional view taken on line 4—4 of Figure 2.

Referring now to Figures 1 and 2 of the drawings, there is shown therein a pressure relief valve having a casing 10 which includes a base 12 and a bonnet 14 provided with circumferential flanges 16 and 18, respectively, that are secured together, as by bolts 20, with a centrally-apertured flexible diaphragm 22 clamped therebetween. The diaphragm divides the interior of the casing 10 into a valve or base chamber 24 and a booster or bonnet chamber 26. The base 12 has a lower interiorly threaded inlet 28 for connection to a pressure system, e. g., a steam boiler, to be relieved. Threaded into the inner end of the inlet 28 is a nipple 30 forming a flow port 32 from the inlet into the valve chamber 24, which latter is provided with an interiorly threaded lateral outlet 34 for connection to a blow-off pipe (not shown) or the like.

Figure 5:
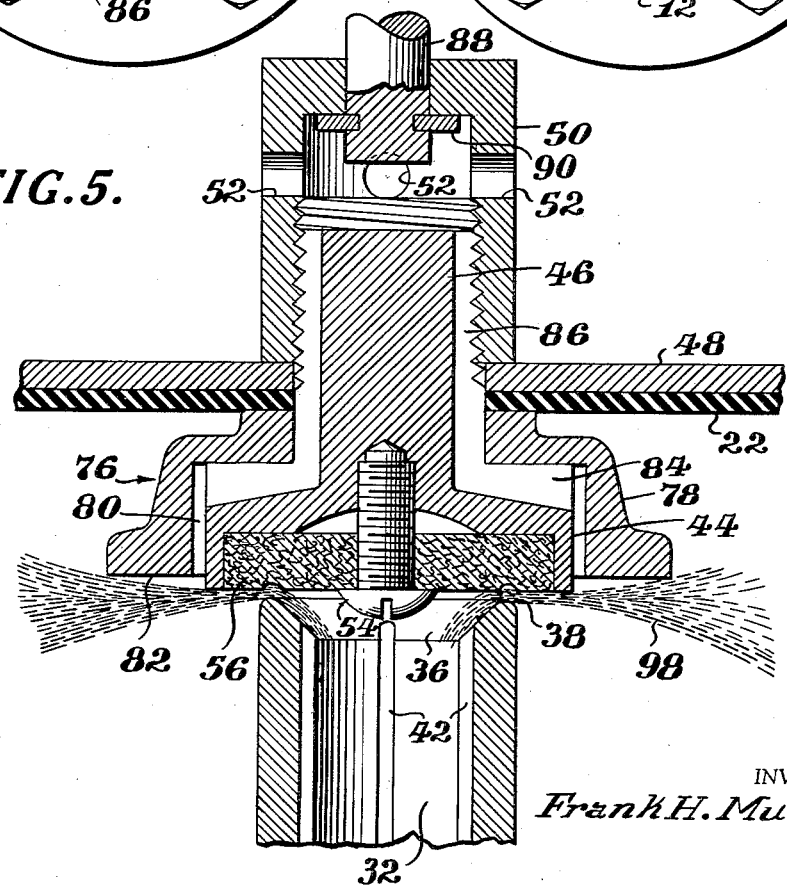
Figure 5 is an enlarged fragmentary view corresponding to Figure 2 but illustrating the valve partially open.

The interior of the nipple 30 is of substantially constant diameter save at its inner end where it flares outwardly to form a flaring valve orifice 36 that merges with an annular bead valve seat 38 formed by the rounded inner end of the nipple, as best shown in Figure 5. The flare angle of the valve orifice 36 preferably is from 30° to 45° with respect to the axis of the nipple 30, and the minor diameter of the flared orifice is from about ½ to about ⅔ of the major diameter thereof to provide an effective flare length. The reasons for these limitations and the desirability of a flared valve orifice will be explained more in detail hereinafter. The nipple 30 projects into the valve chamber 24 and has a smooth cylindrical exterior surface 40 extending rearwardly from the outer edge of the bead seat 38 for reasons later described. Interior longitudinal grooves 42 may be provided at the inner end of the nipple 30 for engagement by a suitable tool (not shown) to screw the nipple into the inner end of the inlet 28 when the bonnet 14 and diaphragm 22 are removed from the base 12.

A valve disc 44 is located in the valve chamber 24 and has a stem 46 projecting through the central aperture in the diaphragm 22 and an aligned aperture in the rigid diaphragm backing plate 48. The end portion of the valve stem projecting into the booster chamber 26 is threaded and has a cap nut 50, provided with lateral apertures 52, thereon for clamping the valve disc 44 and the plate 48 to the diaphragm 22. Set into the end face of the valve disc 44 and secured thereto by a central screw 54 is a conventional valve washer 56 of relatively soft composition material. The valve washer 56 seats against the bead seat 38 to close the valve.

Coil compression springs 58, two as shown in the drawings, within the bonnet 14 yieldingly urge the valve disc 44 to seat and have one end thereof bearing against the diaphragm backing plate 48 and the other end thereof against a thrust washer or spring button 60 having a stem 62 engaging complementary threads in a vertical central opening through the top of the bonnet 14. Both the button 60 and its stem 62 have an axial through bore 64. The button stem 62 is provided on its outer end with diametric kerfs 66 for engagement by an appropriate tool (not shown) for threading the stem inwardly and outwardly of the bonnet 14 in order to adjust the compression of the springs 58 to vary the relief setting of the valve. Threaded onto the outer end of the button stem 62 is an exteriorly threaded lock nut 68 which bears against the top of the bonnet 14 for locking the stem 62 in its adjusted position. The lock nut 68 is provided with appropriate kerfs 70 in its outer face for engagement by an appropriate adjusting tool (not shown). Threaded onto the lock nut 68 is an interiorly-threaded cap 72 to cover the nut 68 and the outer end of the stem 62. The cap 72 has an axial bore 74 registering with and of substantially the same diameter as the stem and button bore 64.

Clamped between the upper surface of the valve disc 44 and the diaphragm 22 is a centrally-apertured caplike shield 76 having a peripheral annular skirt 78 of slightly greater interior diameter than the exterior diameter of the valve disc and in surrounding coaxial spaced relation to the periphery thereof to provide an annular passageway 80 therebetween. The end face 82 of the skirt 78 is flat, annular, and offset slightly rearwardly of the end face of the valve disc 44. The upper surface of the valve disc 44, i. e., the shoulder formed at the valve stem 46, is provided with a plurality, four as shown in the drawings, of equally angularly-spaced radial grooves 84 which communicate at their outer ends with the inner end of the annular passageway 80. At their inner ends the grooves 84 merge into the lower ends of corresponding longitudinal grooves 86 extending the length of the valve stem 46. It will thus be seen that the annular passageway 80, the grooves 84 and 86, the interior of the cap nut 50, and the lateral apertures 52 therein constitute a duct providing communication between the outer end of the annular passageway 80 and the interior of the bonnet, i. e. the booster chamber 26.

A test rod 88 slidingly extends through the bores 74 and 64 in the cap 72, stem 62, and button 60 and through a central aperture in the cap nut 50, the inner end of the rod being provided with a circumferential groove having a split ring 90 therein for providing lifting engagement between the rod and the cap nut, and hence, the valve disc 44. Pivotally connected to the outer end of the test rod 88 is the forked end of a test lever 92. The under surfaces of the arms 94 of the lever 92 are cam-shaped to bear against the top of the cap 72 so that counterclockwise movement of the test lever, as shown in Figure 2, will lift the test rod 88 to unseat the valve disc 44 for test purposes. A circumferential groove is provided in the walls of the bore 74 of the cap 72 and an O-ring 96, preferably circular in radial section, is disposed in the groove for sealing engagement with the cap and the periphery of the test rod 88 in order to seal the booster chamber 26 from the atmosphere.

In operation of the pressure relief valve described above, the compression force of the springs 58 is adjusted so that they will exactly counterbalance the force provided by a predetermined pressure acting through the flow port 32 on the central area of the valve washer 56 encompassed by the bead seat 38. At pressures above this predetermined pressure, the springs 58 will yield and the valve disc 44 will lift from its seat 38. Thereupon fluid, for example, steam, flows at high velocity radially outwardly in a fan-shaped stream 98 between the valve seat 38 and the valve disc 44, as illustrated in Figure 5. Because of the high velocity of this stream 98, its static pressure is considerably reduced, being in fact below atmospheric pressure. As the stream 98 flows beyond the periphery of the valve disc 44 and the shield skirt 78, its velocity is slowed, even before impact with the side walls of the valve chamber 24, and the static pressure of the stream recovers to about atmospheric pressure. Because of the resistance to fluid flow from the valve chamber 24 to and through the outlet 34, and any flow resistance of the blow-off pipe (not shown), the pressure within the valve chamber usually is slightly above atmospheric pressure when flow takes place through the valve.

As is best shown in Figure 5, the seat flow stream 98 passes at high velocity across the outer end of the annular passageway 80 so that the reduced pressure of the seat flow stream is communicated, via the passageway 80, the grooves 84 and 86, and the apertures 52 in the cap nut 50, to the booster chamber 26. Since the seat flow pressure is far below the recovered pressure in the valve chamber 24 and usually far below atmospheric pressure, the pressure within the booster chamber 26 is correspondingly reduced. The net result is a pressure differential on the diaphragm 22 which exerts a greater lifting force on the valve disc 44 than that afforded by the initial opening pressure alone, so that once the valve initially opens the aforementioned pressure differential, i. e., pressure in the valve chamber minus the pressure in the booster chamber, acts on the entire exposed area of the diaphragm to exert an additional lifting force on the valve disc. By actual test such pressure differential may be as much as six pounds per square inch. When the inlet pressure drops sufficiently for the springs 58 to overcome the pressure forces holding the valve open the valve disc 44 reseats and closes the valve.

As stated heretofore, preferably the flat annular end face 82 of the shield 76 is offset slightly rearwardly of the end face of the valve disc 44 so that the seat flow pressure will be "picked up" effectively by the outer end of the annular passageway 80 and transmitted to the booster chamber 26.

Obviously, the reduced seat flow pressure is effective on an annular area of the valve disc 44 to somewhat counteract the opening force thereon created by system pressure acting on the end area of the valve disc encompassed by the bead seat 38. This counteracting force, as heretofore described, is known as a closing effect and under some conditions sufficiently upsets the balance of forces acting on the valve disc to cause the same to chatter on its seat. Accordingly, it is desirable to minimize this closing effect, and this may be accomplished only by making the annular area of the valve disc 44 affected by the seat flow pressure as small as possible for a given diameter valve seat, i. e., by making the disc diameter as small as possible.

In a conventional valve seat nipple the flow port is of substantially constant diameter throughout its length, and the exterior of the nipple tapers rearwardly from the bead seat. Since a valve washer becomes somewhat embedded on the bead seat when the valve is closed, such washer, together with its valve disc or holder, must have sufficient material disposed radially outwardly of the line of initial contact between the washer and its seat to accommodate the aforedescribed exterior rearward taper of the end of the nipple. By means of a flared valve orifice without an exterior nipple taper, as described above, the necessity for this extended area of material is minimized with a consequent reduction possible in overall washer and valve disc diameter for any given size bead seat to thus minimize the valve closing effect.

Further, it has been found that for a given diameter bead seat a flared valve orifice having the proportions hereinbefore referred to permits of increased flow capacity for a given inlet pressure and valve opening, i. e., the axial separation between the valve disc and its seat. This result is accomplished because it is believed that the flared orifice 36 gradually changes the axial flow in the nipple 30 to a radially-outward flow between the valve disc 44 and its seat 38 to thereby make for a thicker fan-like radial flow stream than that accomplished by a conventional unflared orifice wherein the axial flow through the seat nipple is abruptly changed to a radial flow. In this connection, it has been generally presumed heretofore that the minor inner diameter of a valve orifice or flow port affects the flow capacity therethrough. This presumption is incorrect, however, and it has been found that a flared valve orifice having relatively small minor diameter will actually increase flow capacity for a given seat diameter. Obviously, increased flow capacity affords greater pressure relief.

Referring now to Figure 8 of the drawings, there is shown a modified form of a pressure relief valve embodying this invention. In this modification the end of the valve stem 100 projecting into the bonnet 102 through the diaphragm 104 is clamped to the latter by a conventional nut 106 and provided with a reduced smooth-surfaced cylindrical extension 108. This extension 108 passes through a smooth bore in a dished rigid partition 110 clamped between the base 112 and the bonnet 102 along with the diaphragm 104. The cylindrical stem extension 108, where it passes through the partition 110, is provided with a circumferential groove having an O-ring 114 therein which provides an effective seal between the stem extension and the walls of the bore in the partition 110, so that the space between the partition and the diaphragm 104 constitutes a booster chamber 116. Above the partition 110 the cylindrical extension 108 is further reduced and threaded for the reception of a cap nut 118 having a lower outer circumferential flange 120 forming an abutment for the lower ends of the valve springs 122 to urge the valve disc 124 into engagement with the valve bead seat 126. A test rod 128 is secured to the cap nut 118 in the same manner as the rod 88 illustrated in Figure 2 is secured to the cap nut 50.

It will thus be seen that the objects of this invention have been fully and effectively accomplished. It will be realized, however, that the specific embodiments shown and described to illustrate the principles of this invention are susceptible to change without deviation from such principles. Therefore, this invention includes all modifications encompassed by the spirit and scope of the following claims.

I claim:

1. In a pressure relief valve having an outlet for relieving a pressure system, an inlet connectable thereto, valve means having opposed sealing surfaces controlling said outlet and urged to open position by pressure in the system, and means yieldingly urging the valve means to closed position, the combination of pressure responsive means connected to the valve means and operable by reduced pressure to urge the valve means to open, and duct means for communicating to said pressure responsive means the reduced pressure of the fluid stream flowing between the sealing surfaces of the valve means when the latter is open for effecting a greater opening of the valve means after its initial opening by system pressure than the valve opening obtainable by system pressure alone, the inlet end of said duct means being located so as to be out of communication with the valve inlet when the valve means is closed.

2. In a pressure relief valve having an outlet for relieving a pressure system, an inlet connectable thereto, valve means having opposed sealing surfaces controlling said outlet and urged to open position by pressure in the system, and means yieldingly urging the valve means to closed position, the combination comprising: means defining a closed booster chamber having a movable wall; means connecting said wall to the valve means for opening the latter on movement of said wall inwardly of said chamber; and duct means for communicating to said chamber the reduced pressure of the fluid stream flowing between the sealing surfaces of said valve means after the latter is initially opened by system pressure, the inlet end of said duct means being located so as to be out of communication with the valve inlet when the valve means is closed.

3. A pressure relief valve comprising: a housing having an inlet, an outlet, and an outlet chamber in communication with said outlet; valve means including an annular member and a cooperating body member, one constituting a seat for the other and one being fixed and the other being movable toward and away therefrom, said annular member being disposed in and sealing with said inlet and providing a flow port from said inlet to said outlet chamber, pressure in said inlet being effective to urge said movable member away from said fixed member; means yieldingly urging said movable member toward said fixed member; means defining a closed booster chamber having a movable wall; means connecting said wall to said movable valve member for movement away from said fixed valve member on movement of said wall inwardly of said booster chamber; and duct means for communicating to said booster chamber the reduced pressure of the high velocity stream of fluid which flows between said valve members after the initial separation thereof by inlet pressure, the inlet end of said duct means being located so as to be out of communication with said housing inlet when said valve means is closed.

4. The structure defined in claim 3 in which the duct means has a point of termination in the outlet chamber adjacent the edge of the sealing surface of one of the valve members.

5. A pressure relief valve comprising: means defining a port connectable to a pressure system for relief of pressure therethrough; a valve including an annular valve seat on the outlet side of said port and a reciprocating valve head cooperable with said seat; means yieldingly urging said valve head toward said seat; means defining a closed chamber having a movable wall; means connecting said wall to said valve head for movement of the latter away from said seat upon movement of said wall inwardly of said chamber; and a duct having a point of termination closely adjacent the base of the seat flow stream emerging from between said valve head and said seat when separated for communicating to said chamber the reduced static pressure of said stream, said point being located so that said duct means is out of communication with said port when said head is seated on said seat.

6. A pressure relief valve comprising: means defining a circular port connectable to a pressure system for relief of pressure therethrough; a circular reciprocating valve head seatable on the outlet end of said port; means defining a circular groove in said valve head coaxial with, facing, and of greater diameter than said port outlet end; means yieldingly urging said valve head to seat; means defining a closed booster chamber having a movable wall; means connecting said wall to said valve head for unseating movement upon movement of said wall inwardly of said chamber; and duct means providing communication solely between said groove, adjacent the bottom thereof, and said chamber.

7. The structure defined in claim 6 in which the valve end surface outside the groove is offset slightly rearwardly from the valve end surface bounded by said groove.

8. The structure defined in claim 6 in which the valve end surface bounded by the groove is flat and the valve end surface outside said groove is flat, annular, and offset slightly rearwardly from said groove-bounded surface.

9. In a pressure relief valve having a casing provided with an interior chamber having an outlet therefrom and an inlet port thereto, an annular valve seat on the outlet end of the inlet port, a reciprocating valve member in the chamber seatable on the seat, and spring means for urging the valve member to seat, the combination comprising: a flexible diaphragm forming a wall of the chamber and having the valve member secured centrally thereto; means including said diaphragm defining a separate closed booster chamber on the opposite side of said diaphragm from the inlet port; and a duct for communicating to said booster chamber the pressure of the fluid stream flowing between the seat and the valve member when the valve member is unseated, the inlet end of said duct being located so as to be out of communication with the inlet port when the valve member is seated.

10. A pressure relief valve comprising: a casing provided with an interior chamber having an outlet therefrom and an inlet port thereto; an annular valve seat on the outlet end of said inlet port; a reciprocable circular valve member in said chamber seatable on said seat and having a stem; a flexible diaphragm forming a wall of said chamber and having a central aperture receiving said valve stem; means on said stem clamping said valve member to said diaphragm; spring means outside said chamber for urging said valve member to seat; means including said diaphragm defining a separate closed booster chamber; shell means circumscribing the periphery of said valve member, fixed thereto, and spaced therefrom to define therewith an annular passageway, the outer end of which is adjacent the seat flow stream as the latter flows radially outwardly from between said valve member and said seat; and groove means providing communication solely between the inner end of said passageway and said booster chamber.

11. The structure defined in claim 10 in which the shell means has an annular end face offset slightly rearwardly from the end face of the valve member.

12. A pressure relief valve comprising: a casing having therein a flexible diaphragm forming a common wall of two separate chambers, one of said chambers having an outlet therefrom and an inlet port facing said diaphragm; an annular valve seat on the inner end of said inlet port; a circular valve member in said one chamber seatable on said seat; a stem on said valve member extending centrally through said diaphragm; a nut on said stem clamping said valve member to said diaphragm; spring means outside said one chamber urging said valve member to seat; a shell member clamped between said valve member and said diaphragm and having an annular skirt in surrounding spaced relation to said valve member to form an annular passageway therebetween; and grooves in said valve member and said stem providing communication solely between said passageway and the other of said chambers, said other chamber being closed except for said communication.

13. A pressure relief valve comprising: a casing including a base and a bonnet, said base having an inlet port, an opening opposite the latter, and an outlet disposed laterally of said inlet port, and said bonnet covering said base opening; a flexible diaphragm closing said opening clamped between said base and said bonnet and defining therewith a valve chamber in said base and a closed booster chamber in said bonnet; an annular valve seat on the inner end of said inlet port; a circular valve member in said valve chamber seatable on said seat; a stem on said valve member extending centrally through said diaphragm; a nut threaded on said stem in said booster chamber clamping said valve member to said diaphragm; spring means in said booster chamber bearing against said diaphragm for urging said valve member to seat; a centrally-apertured cap-like shell clamped between said valve member and said diaphragm and having an annular skirt in surrounding spaced relation to the periphery of said valve member to form an annular passageway therebetween; and grooves in said stem and between said shell and said valve member providing communication solely between said passageway and said booster chamber.

14. A pressure relief valve comprising: a casing including a base and a bonnet, said base having an inlet port, an opening opposite the latter, and an outlet disposed laterally of said inlet port, and said bonnet covering said base opening; a flexible diaphragm closing said opening clamped between said bonnet and base and providing a valve chamber in the latter; a rigid partition in said bonnet spaced from said diaphragm to provide a closed booster chamber therebetween; an annular valve seat on the inner end of said inlet port; a circular valve member in said valve chamber seatable on said seat; a stem on said valve member extending centrally through said diaphragm and sealingly through said partition; a nut threaded on said stem in said booster chamber clamping said valve member to said diaphragm; spring means in said bonnet outside said booster chamber and engaging said valve stem for urging said valve member to seat; a centrally-apertured cap-like shell clamped between said diaphragm and said valve member and having an annular skirt in surrounding spaced relation to the periphery of said valve member to form an annular passageway therebetween; and grooves in said stem and between said shell and said valve member providing communication solely between said passageway and said booster chamber.

15. The structure defined in claim 3 wherein the body member surface which cooperates with the annular member is substantially flat and the annular member has a flared valve orifice, the flare angle of which is of the order of from about 30° to about 45° to the axis of the valve seat and the minor diameter of which is of the order of from about ½ to about ⅔ the major diameter thereof.

16. The structure defined in claim 1 in which the duct inlet end is located so as to be in communication with the outlet when the valve means is closed.

References Cited in the file of this patent
UNITED STATES PATENTS

| Number | Name | Date |
|---|---|---|
| 84,586 | Shackleton | Dec. 1, 1868 |
| 306,208 | Ashton | Oct. 7, 1884 |
| 1,221,719 | Fritch | Apr. 3, 1917 |
| 1,668,075 | Hellwig | May 1, 1928 |
| 1,685,866 | Raymond | Oct. 2, 1928 |
| 1,925,323 | Hopkins | Sept. 5, 1933 |
| 2,278,437 | Gentzel | Apr. 7, 1942 |
| 2,279,002 | MacNeil | Apr. 7, 1942 |
| 2,387,363 | Terry | Oct. 23, 1945 |
| 2,603,231 | Birkemeier | July 15, 1952 |

FOREIGN PATENTS

| Number | Country | Date |
|---|---|---|
| 494,109 | France | of 1919 |
| 678,749 | Germany | of 1939 |